US005193342A

United States Patent [19]

Omberg et al.

[11] Patent Number: 5,193,342

[45] Date of Patent: Mar. 16, 1993

[54] PROPORTIONAL SPEED CONTROL OF FLUID POWER DEVICES

[75] Inventors: Carl-Johan Omberg, Eskilstuna, Sweden; James P. Janecke, Waukesha, Wis.

[73] Assignee: Applied Power Inc., Butler, Wis.

[21] Appl. No.: 837,296

[22] Filed: Feb. 14, 1992

[51] Int. Cl.[5] .............................................. F16D 31/02

[52] U.S. Cl. ........................................ 60/426; 91/518; 91/519

[58] Field of Search ................. 60/420, 422, 426, 427, 60/431, 433, 434, 445, 452, 484; 91/511, 512, 514, 518, 461; 157/596.13

[56] References Cited

U.S. PATENT DOCUMENTS

| | | | |
|---|---|---|---|
| 4,510,847 | 4/1985 | Mucheyer et al. | 91/461 |
| 4,606,258 | 8/1986 | Kauss | 91/461 X |
| 4,611,528 | 9/1986 | Nanda et al. | 91/461 X |
| 4,635,440 | 1/1987 | Kropp | 60/431 X |
| 4,718,329 | 1/1988 | Nakajima et al. | 91/461 X |
| 4,733,600 | 3/1988 | Masano | 91/461 X |
| 4,738,103 | 4/1988 | Tha | 60/460 X |

*Primary Examiner*—Edward L. Look
*Assistant Examiner*—Hoang Nguyen
*Attorney, Agent, or Firm*—Quarles & Brady

[57] ABSTRACT

A hydraulic circuit for controlling the speed of multiple hydraulic fluid power devices when the flow demand of the devices exceeds the flow capacity of a pressure source supplying hydraulic fluid under pressure to the devices has multiple pressure controlled proportional flow supply valves for controlling the supply of hydraulic fluid to the power devices. Load sense pressures which indicate the pressure delivered by the valves to the corresponding devices are compared to determined the highest load sense pressure, which is compared to the supply pressure by a proportional speed sensing valve to regulate the pilot pressure. In the preferred embodiment, the pilot pressure is regulated by the proportional speed sensing valve to be equal to the differential between the supply pressure and the highest load sense pressure, and a limit control is provided in one form of the proportional speed sensing valve. Thus, when the differential between supply pressure and the highest load sense pressure starts falling, as occurs when the flow demand exceeds the flow capacity of the pump, the pilot pressure is reduced, which reduces flow to the power devices proportionally to reduce the speeds of the devices while maintaining substantially constant the proportions of the speeds to one another.

19 Claims, 3 Drawing Sheets

FIG. I

PROPORTIONAL SPEED CONTROL OF FLUID POWER DEVICES

FIELD OF THE INVENTION

This invention relates to control of fluid power devices, and particularly to controlling the speed of fluid power devices when the demand of the devices exceeds the flow capacity of a hydraulic fluid pressure source common to the devices.

BACKGROUND OF THE INVENTION

In a typical hydraulic power operated system, a hydraulic pump, which may produce either a fixed flow rate or a variable flow rate, provides a source of pressurized hydraulic fluid to power multiple fluid operated devices which are plumbed into the system. In a lifting application, the fluid power devices may be two or more hydraulic cylinders. In another application, for example dispensing salt from the dump box of a snow removal truck, the fluid power devices may be two hydraulic motors, one for operating an auger to move the salt from the box to a rotary spreader and another for rotating the spreader so as to distribute the salt from the auger discharge across a roadway. Different types of fluid power devices may be combined depending upon the application and the effect desired, such applications being virtually limitless.

In applications where two or more fluid power devices are employed, the fluid power devices are almost always controlled, either manual remote or automatically, so that they work in synchronization with one another. For example, in the lifting application described above, when lifting a load the cylinders must advance at the same rate in order to keep the load level, or at least must advance at a fixed rate in proportion to one another so as to keep the orientation of the load from shifting. Similarly, in the salt dispensing application example described above, the speed that the auger delivers salt to the rotary table must be controlled in relation to the speed of rotation of the table.

A problem in controlling the relative speeds of two or more fluid power devices occurs when the flow demand of the devices exceeds the maximum flow capacity of the pump supplying the system. Under these circumstances, the fluid power devices having the lower pressures are favored over the higher pressure devices. Therefore, the lower pressure devices receive more flow and the higher pressure devices receive less. This results in the relative speeds of the devices changing, with the higher pressure devices slowing down in relation to the lower pressure devices, which is undesirable.

SUMMARY OF THE INVENTION

The invention provides a hydraulic circuit for supplying a flow of hydraulic fluid from a source of pressurized hydraulic fluid to multiple fluid power devices which overcomes the above disadvantages. The circuit includes at least two work segments, each having a pressure operated proportional flow supply valve for controlling a flow of pressurized hydraulic fluid to a fluid power device. A control pressure port communicates with each supply valve for operating the valve in proportion to a pressure at the control pressure port. A pressure control valve provides communication between the pilot pressure port and the control pressure port for reducing a pressure at the pilot pressure port to a desired pressure at the control pressure port. Communication is provided between a proportional speed sensing valve and the pilot pressure ports of two or more work segments and a supply pressure of pressurized hydraulic fluid is supplied to the proportional speed sensing valve. A load sense pressure indicative of a pressure of fluid supplied by at least one of the work segments to a fluid power device controlled by the segment is communicated to the proportional speed sensing valve, and the proportional speed sensing valve regulates the pressure at the pilot pressure ports of two or more work segments in response to a differential between the supply pressure and the load sense pressure.

With this control, when the flow demands of the work segments exceed the maximum flow capacity of the source of pressurized hydraulic fluid, the differential between the supply pressure and the load sense pressure starts falling. In response, the proportional speed sensing valve regulates the pilot pressure downwardly, by the same amount as the decrease in the differential or in proportion to it. Since the pilot pressure to the work segments is decreased by the same amount, the supply valves are controlled proportionately to reduce the flow through them. Therefore, the speeds of the power devices controlled by the supply valves are reduced while substantially maintaining the proportions of the speeds to one another. When the flows through the supply valves are reduced sufficiently so that the demand of the work segments equals the flow capacity of the source, the differential between the supply pressure and the load sense pressure will assume a relatively constant value and proportional speed sensing valve will modulate to maintain the pilot pressure relatively constant. When the demand subsides to below the flow capacity of the source, the differential between the supply pressure and the load sense pressure increases and the proportional speed sensing valve regulates the pilot pressure accordingly to increase the speeds of the power devices while maintaining the proportions of their speeds.

In a preferred form, the load sense pressures of the work segments controlled by the proportional speed sensing valve are compared to determine the highest of them and the highest is communicated to the proportional speed sensing valve. Therefore, the pilot pressure is regulated in accordance with the differential between the supply pressure and the highest load sense pressure, to insure that none of the work segments are starved.

In another useful aspect, the proportional speed sensing valve reduces the pressure supplied to the pilot pressure ports of the two or more work segments in response to a differential between the load sense pressure and said supply pressure falling below a certain limit. In this regard, as long as the differential stays above the limit, changes in the differential do not affect the regulation of the pilot pressure by the proportional speed sensing valve. Only when the differential falls below the limit does the proportional speed sensing valve start modulating in response to the changing differential. Therefore, under normal operating conditions in which the flow capacity of the source exceeds the demand of the work segments, the proportional speed sensing valve maintains the pilot pressure at a more nearly constant level.

In a preferred form, the proportional speed sensing valve balances a force produced by the supply pressure against forces produced by the load sense pressure and the pilot pressure. The areas on which the supply, load sense and pilot pressures act can be made equal, so that the pilot pressure is regulated to be equal to the differential between the supply and load sense pressures. The proportional speed sensing valve is also preferably biased open to insure proper start-up of the circuit.

In one form, the proportional speed sensing valve has a housing with a supply port, a load sense port, a pilot port and a flow restriction land between the supply port and the pilot port. A valve spool is slideable in an axial direction within a bore of the housing and has a supply face facing in one axial direction in communication with the supply port, a pilot face facing in the other axial direction in communication with the pilot pressure port, a load sense face facing in the same axial direction as the pilot face and in communication with the load sense port, and a flow restricting land which cooperates with the housing land to vary the size of a restriction between the supply port and the pilot port. Thereby, the spool modulates within the bore to regulate the pilot pressure in response to the differential between the supply pressure and the load sense pressure so as to maintain the speeds of the power devices substantially in proportion to one another as the differential changes.

In an alternate form, the proportional speed sensing valve has a valve spool slidable within the housing in an axial direction to vary the size of a restriction between the supply port and the pilot port, and a control actuator slidable within the housing in the axial direction in response to a differential between the supply pressure and the load sense pressure acting on the control actuator. The valve spool and the control actuator are coupled so that the valve spool moves with movement of the control actuator. Preferably, a spring couples the valve spool and the control actuator and an abutment stops the movement of the control actuator at a certain differential limit between the supply pressure and the load sense pressure. In this form, the spring causes the valve spool to modulate to maintain the pilot pressure equal to the spring force. When the differential between the load sense pressure and the supply pressure is equal to or above the limit, the supply pressure is high enough to keep the spring compressed while keeping the control actuator against the abutment. Therefore, the proportional speed sensing valve only responds to changes in the differential between the supply pressure and the load sense pressure when the differential falls below the limit (causing the spring force to relax), so that above the limit the pilot pressure is held relatively constant.

Preferably, the circuit has a supply pressure bypass valve which balances a supply pressure against a load sense pressure to maintain a certain differential between the supply pressure and the load sense pressure under normal operating conditions, when the flow capacity of the source exceeds the demand of the work segments. Under those circumstances therefore, the proportional speed sensing valve regulates the pressure supplied to the pilot ports of the work segments to be substantially equal to the differential set by the bypass valve.

Other objects and advantages of the invention will be apparent from the detailed description and drawings.

DETAILED DESCRIPTION OF THE PREFERRED EMBODIMENTS

Figure 1:
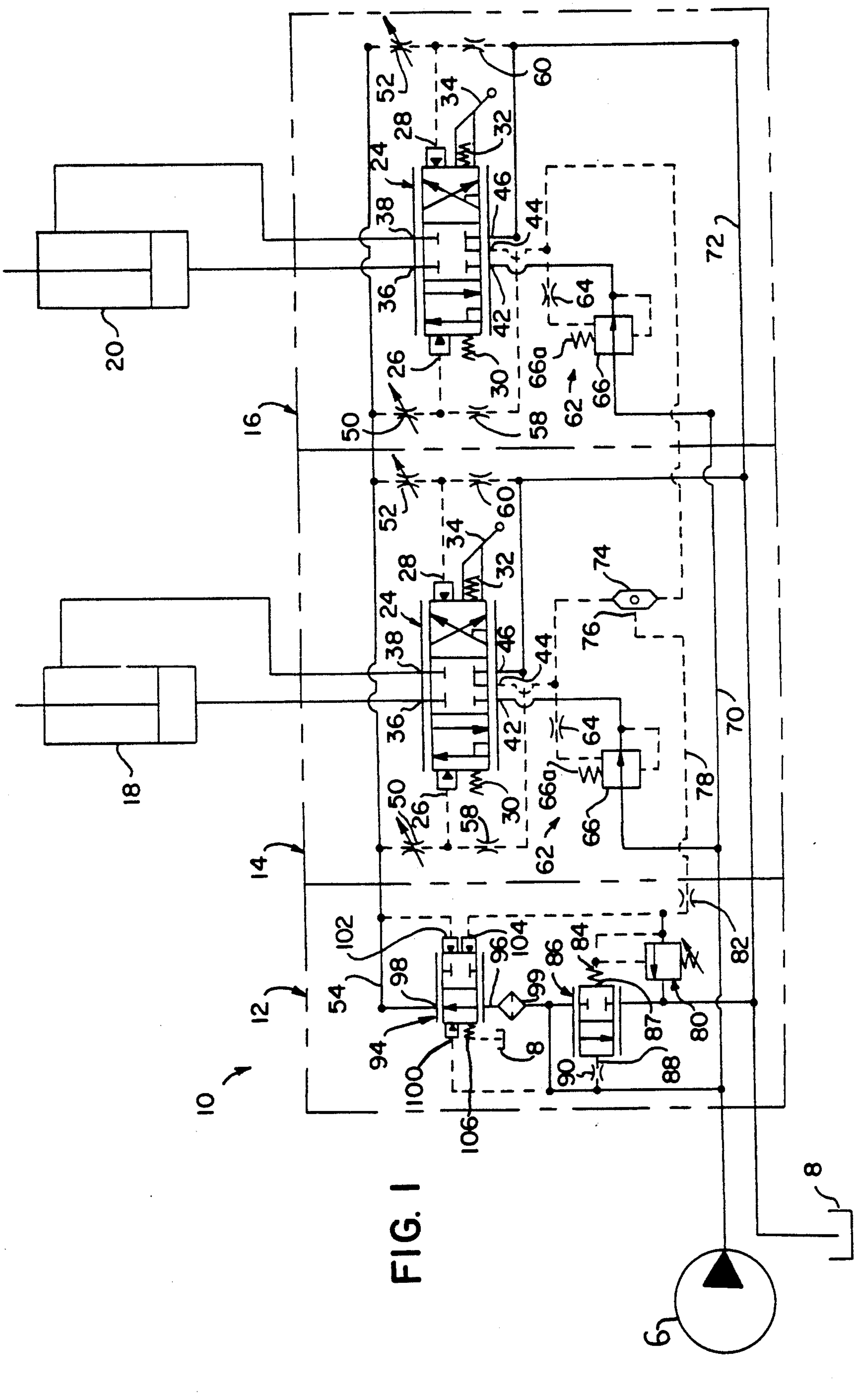
FIG. 1 is a schematic view of a hydraulic circuit employing a fixed displacement pump and incorporating the invention.

Referring to FIG. 1, a hydraulic circuit 10 of the present invention includes an inlet segment 12 and two work segments 14 and 16, each segment 12, 14 and 16 being bounded by broken lines. Dashed lines of the circuit 10 show control pressure lines and solid lines show working pressure lines. Each work segment 14 and 16 is provided for controlling fluid flow to and from a power operated device, and the inlet segment 12 is provided for controlling the supply of hydraulic fluid under pressure from hydraulic pump 6 to the work segments 14 and 16. Reservoir tank 8, typically vented to atmospheric pressure, is also provided for return of hydraulic fluid from the circuit 10.

As schematically depicted in FIG. 1, the power operated device controlled by work segment 14 is a double acting hydraulic cylinder 18 and the device controlled by work segment 16 is a double acting hydraulic cylinder 20. For purposes of the invention, the power operated devices controlled by the work segments of the hydraulic circuit could be any type of fluid operated device such as the cylinders 18 and 20 shown, other types of cylinders or presses, hydraulic motors, or other fluid operated power devices.

The work segments 14 and 16 are identical in most respects. For ease of description, only the work segment 16 will be described, with the reference numerals for corresponding elements applied to the elements in work segment 14.

Each work segment 14 and 16 has a four way, three position pressure operated power supply valve 24. In the preferred embodiment, each valve 24 is a proportional hydraulic valve. Each valve 24 has a control pressure port 26 at one side and a control pressure port 28 at the other side. The ports 26 and 28 receive a control pressure so as to shift the valve 24 one way or the other (in the direction away from the pressurized port 26 or 28) a distance in proportion to the value of the control pressure exerted at the port 26 or 28. Which port 26 or 28 is pressurized therefore determines which way the valve is shifted, and the value of the control pressure determines the degree to which it is shifted.

The valve 24 is biased to a neutral position, shown in FIG. 1, by springs 30 and 32, and manual override handle 34 is provided to manually shift the valve 24 to any desired position. On the upper side of valve 24, a port 36 is provided for communication with the advancement side of cylinder 20 and port 38 is provided for communication with the retraction side of cylinder 20. On the lower side of valve 24, a supply port 42 in communication with supply line 70 via pressure compensator 62, a load sense port 44 and a tank port 46 in communication with tank line 72 are provided. When the pressure at port 26 is sufficient to overcome the biasing force of spring 32, valve 24 is shifted so as to communicate supply port 42 with port 36 and tank port 46 with port 38.

Load sense port 44 is also placed in communication with the downstream side of valve 24 so as to sense the pressure at port 36. In this position of valve 24, cylinder 20 is pressurized so as to advance. How quickly cylinder 20 advances is controlled by varying the pressure applied at port 26, since a higher pressure at port 26 causes a higher flow between ports 42 and 36 and between ports 46 and 38, resulting in a faster advance of the cylinder 20, and a lower pressure at port 26 causes a lower flow between ports 42 and 36 and between ports 46 and 38, resulting in a slower advance.

When the pressure at port 26 is relieved, valve 24 returns to its neutral position shown, which blocks ports 36, 38 and 42 to hold cylinder 20 at its position, and places load sense port 44 in communication with tank port 46. When pressure is applied at port 28 sufficient to overcome the biasing force of spring 30, port 36 is connected to tank port 46 and port 38 is connected to the pressure supply port 42 so as to retract cylinder 20. The speed of retraction is controlled by the pressure applied at port 28, so that a higher pressure applied at port 28 causes faster retraction and a lower pressure at port 28 results in slower retraction. Load sense port 44 is connected to the downstream side of valve 24 in this position to sense the pressure at port 38.

The work segment 16 also has two electro-hydraulic proportional valves 50 and 52. Each of the valves 50 and 52 is electrically controlled to reduce or completely cut off fluid pressure from pilot pressure line 54 to the respective control pressure at the corresponding port 26 or 28. In the preferred form, the electro-hydraulic proportional valves 50 and 52 are of the type described in U.S. Pat. No. 4,774,976, which is hereby incorporated by reference. Fixed or manually adjustable orifices 58 and 60 are provided between respective ports 26 and 28 and tank line 72 so as to provide restrictions for building up pressures at the respective ports 26 and 28 and to allow for relief of those pressures to tank 8 when the corresponding control pressure is shut off by the respective valves 50 and 52.

The work segment 16 also includes a pressure compensator 62, as mentioned above, which includes a orifice 64 and a valve 66. The pressure compensator 62 provides for a substantially constant flow through the alve 24 for any given opening of valve 24 regardless of the absolute values of the load sense and supply pressures. Briefly, in the pressure compensator 62, the valve 66 is biased open by a spring 66a so as to provide communication between supply line 70 and port 42. Valve 66 is also biased open by being connected to load sense pressure (port 44) through orifice 64. Pressure compensated supply pressure downstream of valve 66 is fed back to bias valve 66 closed. Therefore, valve 66 modulates so as to provide a relatively constant pressure drop across valve 24, with the value of the pressure drop being largely determined by spring *66a*. A more thorough description of the operation of compensator 62 can be found in U.S. Pat. No. 4,889,161, the disclosure of which is hereby incorporated by reference.

In the preferred embodiment, each work segment 14 and 16 is commercially available from Apitech, a unit of Applied Power Inc. of Butler, Wis., under the commercial designation "VPL Proportional Valve". While this type of work segment is preferred, it should be understood that the invention could be provided with any type of work segment, for example such as one which is not electro-hydraulically controlled but had a fixed or manually adjustable means for stepping down or cutting off the pilot pressure to the control pressure ports of the power supply valve.

Load sense pressure from port 44 of work segment 16 is communicated to one side of shuttle check 74 and load sense pressure from port 44 of work segment 14 is communicated to the other side of shuttle check 74. Shuttle check 74 may be provided in either work segment 14 or 16 and in any event is provided in the "VPL Proportional Valve" referred to above. Shuttle check 74 communicates the higher of the two load sense pressures from the respective work segments 14 and 16 to a center port 76, which is in communication with the inlet segment 12 by a highest load sense pressure line 78 as further described below.

Line 78 connects pressure relief valve 80 to port 76 through orifice 82 so as to limit the maximum load sense pressure allowable in the circuit 10. If the highest load sense pressure exceeds the pressure setting of valve 80, valve 80 opens to dump the highest load sense pressure to tank 8.

Line 78 also communicates with port 84 of supply pressure bypass valve 86. Valve 86 is biased closed by spring 87, and is also biased closed by the highest load sense pressure at port 84. However, supply pressure also controls valve 86, by being input to port 88 through restriction 90. When supply pressure at port 88 exceeds the highest load sense pressure at port 84 by a certain amount, determined by spring 87, supply pressure is dispensed to tank line 72. In the preferred embodiment, the spring 87 is chosen so that supply pressure is maintained at about 225 psi above the highest load sense pressure. Also, when valve 80 opens to relieve the highest load sense pressure, valve 86 shifts to open to dump supply pressure to tank 8.

The inlet segment 12 also includes a proportional speed sensing valve 94. The valve 94 has a supply port 96 upstream of the valve 94 and a pilot port 98 downstream of the valve 94. The supply port 96 is connected to the pressure supply with a filter 99 interposed. The valve 94 is a variable restriction valve, not one that is only either open or closed.

Control inputs to the valve 94 are a supply control port 100, pilot control port 102 and a load sense control port 104. The load sense control port 104 is in communication with port 76 via line 78 so that it is subjected to the highest load sense pressure from the work segments, the pilot control port 102 is in communication with pilot line 54, which is supplied by port 98, and the supply control port 100 is in communication with supply line 70, as is port 96. In the preferred embodiment, the valve 94 is biased open with a very slight spring force by spring 106 and the spring cavity is vented to tank 8. The spring 106 is provided and is only strong enough to bias the valve 94 to the neutral position shown when the pump 6 is off.

Preferably, the pressures at ports 100, 102 and 104 act on equal areas of the valve 94 so that when the combination of the forces produced by the pilot pressure and the highest load sense pressure equals the force produced by the supply pressure, valve 94 is in equilibrium, disregarding the spring force provided by spring 106, which is negligible. With all three pressures acting on equal areas, when the sum of the highest load sense pressure and pilot pressure equals the supply pressure, valve 94 is balanced. When the load sense pressure rises relative to the supply pressure, valve 94 shifts proportionally so as to reduce the pilot pressure, in order to maintain the sum of the pilot pressure and the highest load sense pressure equal to the supply pressure. Thereby, valve 94 modulates so as to maintain the sum of the pilot pressure and the highest load sense pressure equal to the supply pressure.

This is most beneficial when the flow capacity of the pump 6 is exceeded by the demand of the work segments 14 and 16. For example, if the valves 50 of the work segments 14 and 16 are set to a certain restriction, the cylinders 18 and 20 will each advance at a certain speed and the speeds will be constant and in a fixed proportion to one another so long as the settings of the valves 50 remain unchanged and the pressure in line 70 remains above the highest load sense pressure by the pressure differential set by valve 86. However, if the maximum flow capacity of the pump 6 is being supplied to drive the cylinders 18 and 20 and the cylinders 18 and 20 are not evenly loaded, then relatively more fluid will tend to flow to the cylinder with a lower pressure and the higher pressure cylinder will be relatively starved. In those circumstances in prior hydraulic circuits, the proportion of the speed of the lower pressure cylinder to the speed of the higher pressure cylinder would go up, even though the valves 50 remained at their settings.

This is an undesirable occurrence and the invention operates to curtail it. Normally, when the flow demand of the work segments 14 and 16 is below the flow capacity of the pump 6, valve 94 maintains the pilot pressure (line 54) at a pressure which is approximately equal to the set differential between the supply pressure (line 70) and the highest load sense pressure (line 78), which differential is maintained by valve 86. However, when the work segments demand a flow rate in excess of the flow capacity of the pump 6, the pump is not able to sustain the differential set by valve 86 between the supply pressure (line 70) and the highest load sense pressure (line 78). When this condition occurs, the differential falls, and valve 94 shifts so as to reduce the pilot pressure (line 54) correspondingly to maintain equilibrium. Since the pilot pressure is the input to the valves 50 and 52, any control pressures admitted to the corresponding ports 26 and 28 by the valves 50 and 52 are correspondingly reduced proportionately by the reduction in the pilot pressure, without changing the settings of the valves 50 and 52. Reducing the pressures at the control ports 26 and/or 28 shifts the valves 24 so as to reduce the flow through them to and from the cylinders 18 and 20. However, the proportion of the flow through one of the valves 24 to the flow through the other valve 24 remains substantially constant.

Therefore, when the flow demand of the work segments 14 and 16 exceeds the flow capacity of the pump 6, cylinders 18 and 20 continue to move at speeds which are in substantially the same proportion to one another as the proportion of the settings of the valves 50 and 52 of the respective work segments 14 and 16, but both cylinders go slower. For example, if at settings of valves 50 of the work segments 14 and 16 causing a speed of cylinder 18 of 30 inches per minute and a speed of cylinder 20 of 15 inches per minute, the flow demand exceeds the flow capacity of the pump 6, valve 94 will regulate the pilot pressure downwardly so as to maintain the ratio of the speeds of the cylinders 18 and 20 at approximately 2:1, for example to resultant speeds of approximately 28and 14 inches per minute, respectively.

The flows through the valves 24, and therefore the speeds of the cylinders 18 and 20 are reduced in this manner sufficiently so as to curtail a drop in the differential between the supply pressure and the highest load sense pressure. When the valves 24 have been closed sufficiently to cause the falling differential to bottom, the valve 94 may reach a steady state in which it maintains the pilot pressure at the value of the reduced differential.

When the flow demands of the working segments 14 and 16 subside to below the flow capacity of the pump 6, the supply pressure increases, thereby increasing the differential between the supply pressure and the highest load sense pressure, and in response to that the valve 94 increases the pilot pressure, which causes the valves 24 to open proportionately to increase the speeds of the cylinders 18 and 20 proportionately. When the differential between the supply pressure and the highest load sense pressure increases to the differential set by valve 86, the valve 86 again becomes operative to maintain the set differential between the supply pressure and the highest load sense pressure substantially constant (at 225 psi in the preferred embodiment). The valve 94 correspondingly modulates to provide a pilot pressure substantially equal to the value of the differential maintained by the valve 86.

By cutting down the volumetric flow to both cylinders 18 and 20 while maintaining the same proportionate speeds, the volumetric flow required by the work segments 14 and 16 of the pump 6 is reduced to the capacity of the pump. This maintains the differential between the supply pressure and the highest load sense pressure, albeit reduced, at its maximum value under the particular flow conditions to which the circuit 10 is subjected by the power devices and setting of valves 50 and 52, which results in the pilot pressure assuming a value equal to the reduced differential.

Figure 2:
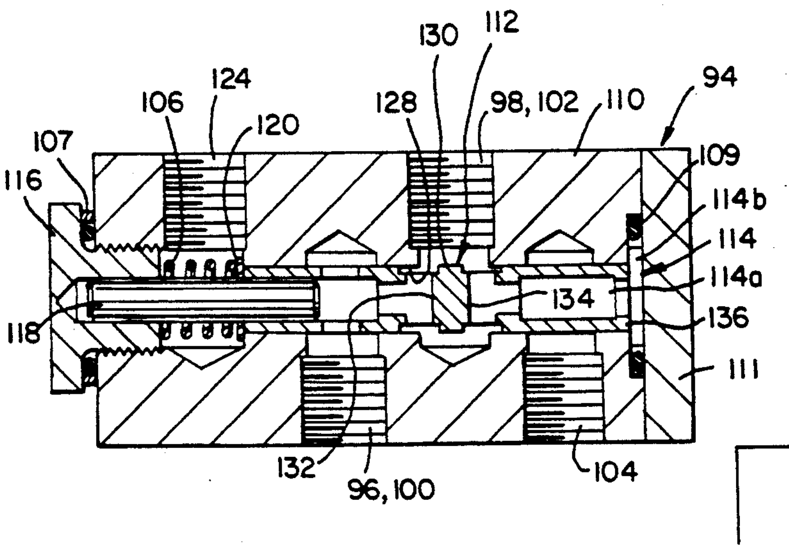
FIG. 2 is a cross sectional view of a valve incorporated in the circuit of FIG. 1.

FIG. 2 illustrates a physical embodiment of a valve 94. Ports in FIG. 2 are labeled with reference numbers corresponding with the reference numbers in FIG. 1. The valve 94 has a housing 110 having a single bore which makes up ports 96 and 100, both connected to supply pressure, a single bore for ports 98 and 102, both connected to pilot pressure, and a bore for port 104, connected to the highest load sense pressure. The housing 110 has an axial bore within which spool 112 is axially slideable. The bore of housing 110 is plugged at its right end as viewed in FIG. 2 by plug 114 having a shank 114*a* journaled within spool 112 and a head 114*b* sandwiched in a recess of housing 110 between the housing and a plate 111 which is secured by fasteners (not shown) against the right end of the housing 110. O-ring 109 creates a seal between housing 110 and plate 111.

The spool bore of housing 110 is plugged at its left end by plug 116 which is sealed by o-ring 107 and has a pin extension 118 journaled in it, and the pin extension 118 is journaled in the left end of spool 112. Supply pressure at port 96, 100 normally holds pin 118 leftwardly as viewed in FIG. 2. A washer 120 is also journaled on pin extension 118 and is held against the end of spool 112 by compression spring 106. The cavity within which spring 106 resides is vented to tank through bore 124.

The housing 110 defines a land 128 between port 96, 100 and port 98, 102. Spool 112 also has a land 130 which cooperates with land 128 to vary the size of the restriction between the port 96, 100 and the port 98, 102. The supply pressure introduced through port 96, 100 acts on an effective area of face 132 of the spool 112 which is equal to the cross sectional area of pin extension 118 and tends to move spool 112 rightwardly, tending to open the restriction between lands 128 and 130.

The pilot pressure in port 98, 102 acts in the opposite direction (leftwardly as viewed in FIG. 2) on an effective area of face 134 of spool 112, which effective area is equal to the cross-sectional area of shank 114*a* adjacent to face 134. The highest load sense pressure at port 104 acts on an annular face 136 of the spool 112 to move the spool 112 in the same direction as the pilot pressure. The fit of the shank 114*a* is a close sliding fit so that there is no substantial pressure communication between the face 134 and the face 136. Therefore, both the pilot pressure and the highest load sense pressure work on independent areas of the spool 112 and tend to close the restriction between lands 128 and 130.

In the preferred embodiment, the effective areas at the pilot face 134 and at the load sense face 136 are equal to one another, and each effective area is also equal to the effective area at the supply face 132. For example, the effective areas at each of the faces 132, 134 and 136 may be equal to 50% of the cross sectional area of the bore through the housing 110 in which the spool 112 is journaled. Thus, disregarding the spring 106, it can be seen that the spool 112 will modulate within the bore of the housing 110 so as to balance the sum of the forces produced by the highest load sense pressure and the pilot pressure with the force produced by the supply pressure. Thereby, when the supply pressure (port 96,100) drops and/or the highest load sense pressure (port 104) rises while the pump 6 is supplying its maximum flow capacity to the work segments 14 and 16, so as to reduce the differential between the supply pressure and the highest load sense pressure, valve 94 reduces the pilot pressure (port 98, 102) in the same amount. Similarly, when the supply pressure rises and/or the highest load sense pressure falls so as to increase the differential between the supply pressure and the highest load sense pressure, the pilot pressure is increased by a like amount.

Under flow demand conditions below the capacity of the pump 6, the valve 94 operates as described above to maintain the pilot pressure at approximately the differential between the supply and the highest load sense pressure. Under sub-capacity flow conditions, this differential is set and held substantially constant by supply pressure bypass valve 86. Therefore, since under sub-capacity flow conditions the pressure differential between the supply pressure and the highest load sense pressure is set by valve 86, valve 94 modulates so as to maintain the pilot pressure at the set value (225 psig in the preferred embodiment) of the differential.

Figure 3:
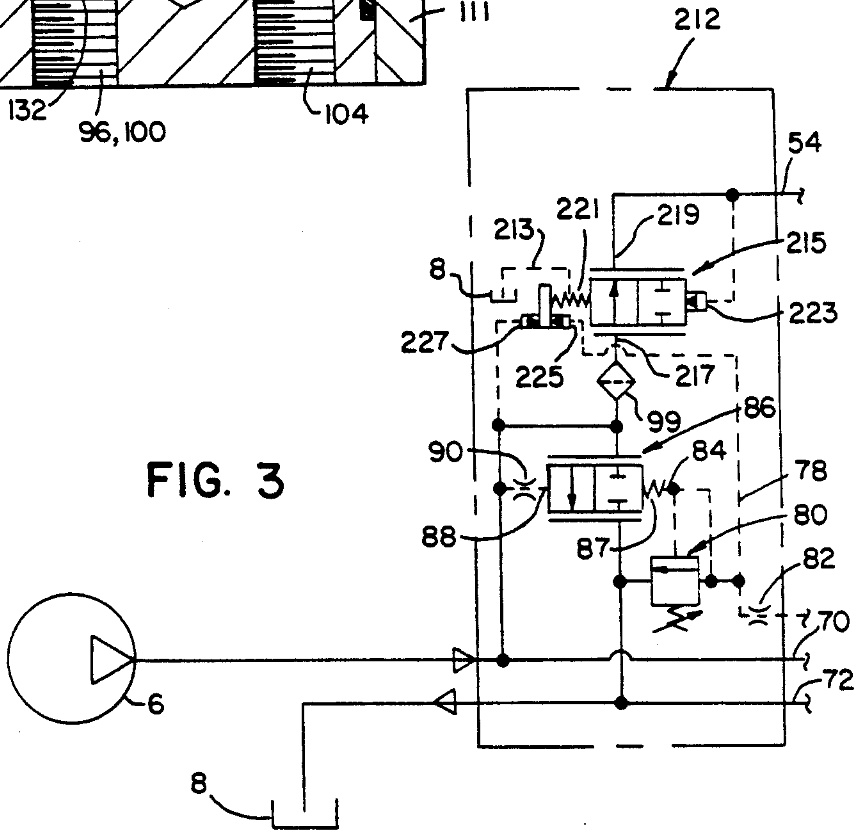
FIG. 3 is a schematic view illustrating an alternate inlet segment for the hydraulic circuit of FIG. 1.

FIG. 3 illustrates an alternate inlet segment 212, the fixed displacement pump 6 and the tank 8. Inlet segment 212 is for connection to work segments such as the work segments 14 and 16, in the same manner as the inlet segment 12.

The only difference between the inlet segment 212 and the inlet segment 12 is that the segment 212 has a proportional speed sensing valve 215 which differs from the proportional speed sensing valve 94 of the inlet segment 12. Valve 215 is also a pressure feedback proportional valve, but has a spring force controlled by a differential between the supply and highest load sense pressures which generates the pilot pressure feedback force. As schematically depicted in FIG. 3, valve 215 has a main supply port 217, pilot ports 219 and 223, load sense port 225 and supply control port 227, spring 221, and the spring chamber of valve 215 is vented to tank 8 through port 213.

Figure 4:
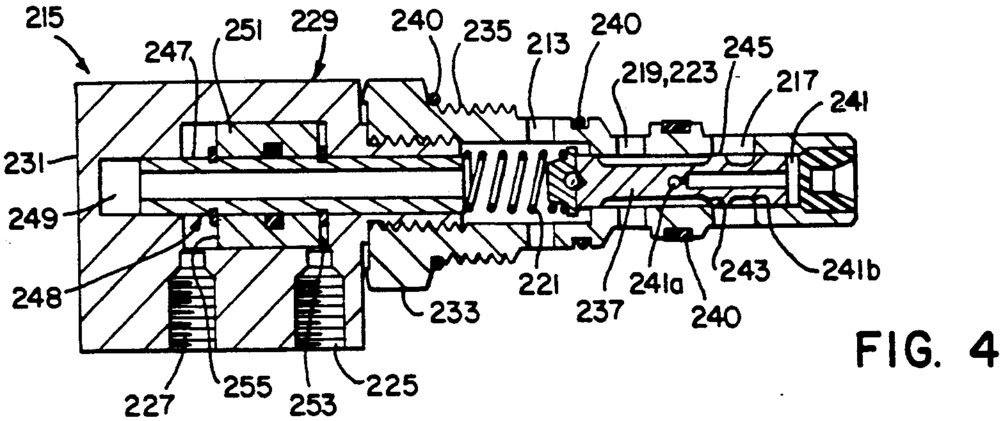
FIG. 4 is a cross sectional view of a valve incorporated in the circuit of FIG. 3.

A physical embodiment of the valve 215 is shown in FIG. 4. In the hardware version of valve 215, both ports 219 and 223 are provided in one port identified 219, 223, and internal plumbing provides for the two functions identified in FIG. 3 for the ports 219 and 223.

The valve 215 has a two piece housing 229 made up of control housing 231 and main housing 233. The control housing 231 is screwed into a threaded bore of the main housing 233 and forms a fluid type seal therewith.

The main housing 233 has external threads at 235 and o-rings 240 separating its various ports so that the main housing 233 can be inserted into a mating bore in a suitable manifold which provides the plumbing to or from the ports of the main housing 233.

The main housing 233 has a bore in which a main spool 237 is axially slideable. The right end of the main housing 233 as shown in FIG. 4 is plugged and spring 221 (See also FIG. 3) bears against the left end of the spool 237. The housing 233 has a land 243 between the port 217 and the port 219, 223 and the spool 237 has a land 245 which cooperates with the housing land 243 to vary the size of the restriction between the port 217 and the port 219, 223 and therefore the pressure drop between those ports. The port 219, 223 is also in communication with feedback chamber 241 through passages 241*a* and 241*b* provided in the spool 237. As viewed in FIG. 4, pilot pressure acting on the spool 237 produces a net force tending to compress spring 221.

In valve 215, the main housing 233, main spool 237 and spring 221 are parts of a pilot reducing cartridge for a "VPL Proportional Valve" inlet section which is commercially available from Apitech, a unit of Applied Power Inc. of Butler, Wis.

A control actuator 248 includes a control slide 247 which is axially slideable in a bore of control housing 231 and bears with its right end as shown in FIG. 4 against spring 221 and is preferably secured thereto by any suitable means. The slide 247 is tubular so that tank pressure at port 213 is communicated to chamber 249 at the left end of the bore in the control housing 231 so as to relieve undesirable pressure buildup due to leakage within the valve 215 and to balance the forces at the ends of the slide 247. The control actuator 248 also includes an annular piston 251 which is axially captured on and sealed to the slide 247 and has a load sense control face 253 in communication with port 225 and a supply control face 255 in communication with port 227.

The following equation describes the forces acting on the main spool 237:

$$A_pP_p=F_s$$

where $A_p$=the net axially facing area of spool 237 which the pilot pressure $P_p$ (at port 219, 223) acts upon; and $F_s$=the force exerted by spring 221 upon spool 237.

The following equation describes the forces acting upon the control actuator 248 with the control actuator 248 in a free state (not at an extreme left or right position):

$$F_s+A_{ls}P_{ls}=A_sP_s$$

where $A_{ls}$=the area of face 253;

$P_{ls}$=the load sense pressure (at port 225);

$A_s$=the area of supply control face 255; and
$P_s$=the supply pressure (at port 227).

Combining these equations, the following equation describes the valve 215:

$$A_pP_pA_{ls}P_{ls}=A_sP_s.$$

In the preferred embodiment, where the supply pressure is preferably set to be approximately 225 psi greater than the highest load sense pressure, for flow rates to the power devices below the maximum flow capacity of the pump 6, the spring 221 is chosen to produce a pilot pressure of approximately 225 psig when the control actuator 248 is in its far rightward position as shown in FIG. 4, where the control actuator 248 is in abutment with the control housing 231. This is the position of the control actuator 248 with the supply pressure 225 psi higher than the highest load sense pressure.

When the differential between the supply pressure and the highest load sense pressure drops below 225 psi, for example when work segment flow demand exceeds the maximum flow capacity of the pump 6 so that the supply pressure cannot rise so as to maintain a 225 psi differential between the supply pressure and load sense pressure, the control slide 247 is shifted leftwardly as viewed in FIG. 4. This reduces the spring force on the leftward end of spool 237, so that the spool 237 also shifts leftwardly, which has the effect of reducing the area of the restriction between the lands 243 and 245, so that the pilot pressure is correspondingly reduced. Reducing the pilot pressure to the work segments reduces the overall flow rate to the work segments without changing the settings of valves 50 and/or 52 and while maintaining the proportion of speeds of one segment to another, as previously described. Therefore, valve 215 modulates the pilor pressure so that when the work segments call for a flow rate beyond the capacity of the pump 6, the pilot pressure to all the work segments is reduced so as to proportionate the overall flow demand to all the work segments at an overall demand which is approximately equal to the maximum flow capacity of the pump and maintain the proportionate speeds of the devices to each other substantially constant.

An advantage of the valve 215 over the valve 94 is that the pilot pressure controlled by valve 215 is unaffected by increases above the set differential between the supply pressure and the highest load sense pressure due to characteristics of valve 86 to pump 261 or other increases. For example, in the preferred embodiment, as long as the differential between the supply pressure and the highest load sense pressure is at least 225 psi, the control slide 247 does not move and remains in abutment against the right side of the control housing 231. If the differential increases above 225 psi, the slide 247 does not move so that the spring force on spool 237 is unaffected by the increase. With the valve 94 on the other hand, an increase in the pressure differential between the supply pressure and the highest load sense pressure results in the valve 94 increasing the pilot pressure to the value of the increased differential, which may cause an increase in the speeds of the devices when it is not desired. Therefore, the valve 215 provides a more constant pilot pressure under normal operation of the hydraulic circuit when the maximum flow capacity of the pump is not exceeded by the flow demand.

Figure 5:
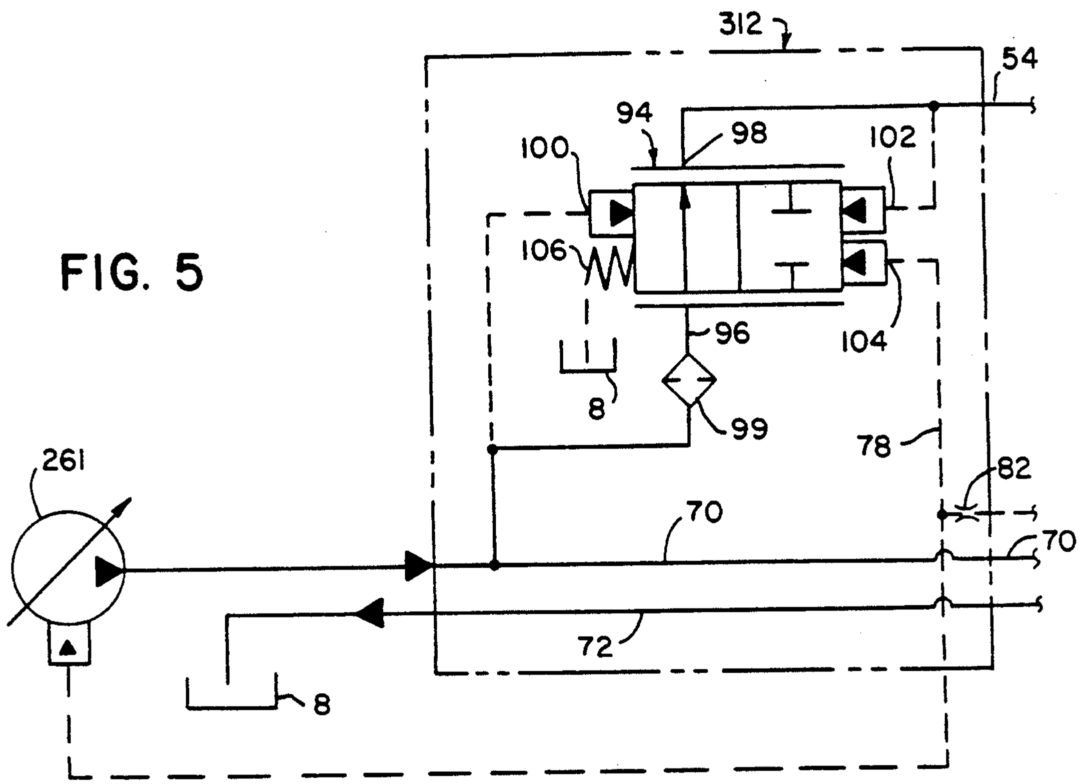
FIG. 5 is a schematic view illustrating an alternate inlet segment for use with a variable displacement hydraulic pump and with the work segments of FIG. 1.
Figure 6:
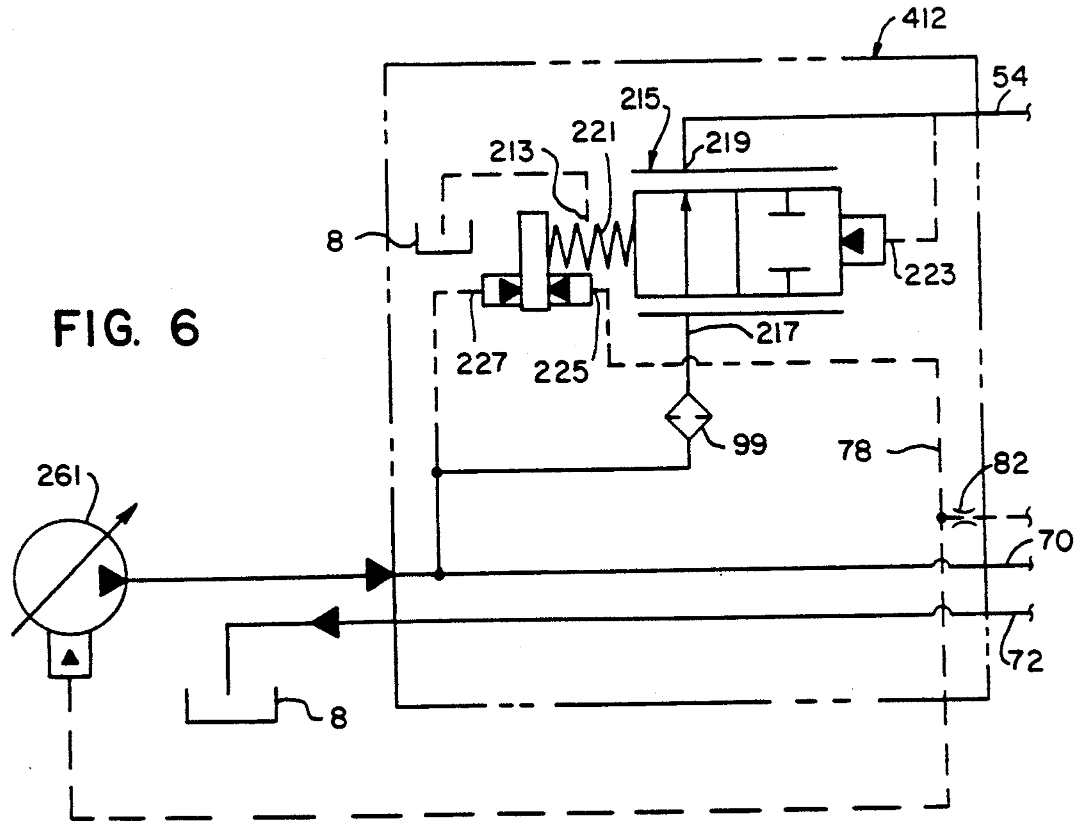
FIG. 6 is a schematic view illustrating another alternate inlet segment for use with a variable displacement hydraulic pump and with the work segments of FIG. 1.

Either valve 94 or 215 may be used with a variable displacement load sensing type hydraulic pump. Inlet segments 312 and 412 having respective valves 94 and 215 are shown respectively in FIGS. 5 and 6. A variable displacement pump 261 is shown in each figure for supplying the inlet segments 312 and 412, and it should be understood that work segments such as segments 14 and 16 could be used with the inlet segments 312 and 412.

Since the pump 261 supplies only the volume required by the work segments, no bypass valve 86 is needed in the inlet segments 312 and 412. In addition, the highest load sense pressure signal is input directly to control the pump 261 as is typical in the art, and no separate load sense pressure relief valve like valve 80 is needed in the inlet segmentes 312 and 412, but can be used in segments 312 and 412 to limit the maximum supply pressure while also maintaining a differential between the supply and load sense pressures.

As is common in the art, it may be desirable to include within any of the circuits described load-holding check valves in the lines between the valve 24 and the cylinders 18 and 20 or elsewhere. However, the valves 94 and 215 reduce the need for such check valves since the valves 94 and 215 operate to reduce flow to the work segments in response to a reduction in the differential between the supply pressure and the highest load sense pressure, which helps prevent reversal of the highest pressure cylinder as a result of a diversion of flow to a lower pressure cylinder.

Many modifications and variations to the preferred embodiments described will be apparent to those of ordinary skill in the art but which will still be within the spirit and scope of the invention. For example, while in the preferred embodiment the areas in the valves 94 and 215 acted upon by the supply and load sense pressures are equal, they need not necessarily be. Moreover, more than two work segments could be provided, any type of pressure operated proportional flow control valve could be used for controlling the supply of hydraulic fluid instead of the four way, three position valves 24 shown, and almost any plumbing arrangement could be used for operating the valves. Therefore, the invention should not be limited to the scope of the preferred embodiments described, but only by the claims that follow.

We claim:

1. A hydraulic circuit for supplying a flow of hydraulic fluid from a source of pressurized hydraulic fluid to multiple fluid power devices, comprising:

at least two work segments, each said work segment including:

a. a pressure operated proportional flow supply valve for controlling a flow of pressurized hydraulic fluid to a fluid power device;

b. at least one control pressure port in communication with said supply valve for operating said valve in proportional to a pressure at said control pressure port;

c. a pilot pressure port; and d. a pressure control valve in communication with said pilot pressure port and said control pressure port for reducing a pressure at said pilot pressure port to a desired pressure at said control pressure port;

a proportional speed sensing valve;

means for providing communication between said proportional speed sensing valve and the pilot pressure ports of two or mroe work segments;

means for communicating a supplying pressure of pressurized hydraulic fluid to said proportional speed sensing valve; and means for communicating a load sense pressure from at least one of said work segments to said proportional speed sensing valve, said load sense pressure being a measure of a pressure of fluid supplied by said work segment to a fluid power device controlled by said segment;

wherein said proportional speed sensign valve regulates the pressure at the pilot pressure ports of two or more work segments in response to a differential between said supply pressure and said load sense pressure.

2. A hydraulic circuit as in claim 1, wherein said load sense pressure communicating means includes means for comparing the load sense pressures of two or more work segments to determine the highest of said load sense pressures and means for communicating said highest of said load sense pressures to said proportional speed sensing valve.

3. A hydraulic circuit as in claim 1, wherein said proportional speed sensing valve reduces the pressure supplied to the pilot pressure ports of the two or more work segments in response to a differential between said supply pressure and said load sense pressure falling below a certain limit.

4. A hydraulic circuit as in claim 1, wherein said proportional speed sensing valve balances a force produced by the supply pressure against forces produced by the load sense pressure and the pilot pressure.

5. A hydraulic circuit as in claim 4, wherein said proportional speed sensing valve regulates said pilot pressure to be substantially equal to the differential between the supply pressure and the load sense pressure.

6. A hydraulic circuit as in claim 4, further comprising means for biasing said proportional speed sensing valve open.

7. A hydraulic circuit as in claim 1, wherein said proportional speed sensing valve comprises a housing having:

a supply port;

a load sense port;

a pilot port; and a flow restriction land between said supply port and said pilot port;

a valve spool slideable in an axial direction within a bore of said housing, said valve spool having:

a supply face facing in one axial direction and in communication with said supply port;

a pilot face facing in the other axial direction and in communication with said pilot pressure port;

a load sense face facing in the same axial direction as said pilot face and in communication with said load sense port; and a flow restricting land which cooperates with said housing land to vary the size of a restriction between said supply port and said pilot port.

8. A hydraulic circuit as in claim 7, wherein said supply, pilot and load sense faces are substantially equal in area.

9. A hydraulic circuit as in claim 7, wherein said spool slides on a stationary pin.

10. A hydraulic circuit as in claim 7, wherein said spool is biased so as to open said restriction.

11. A hydrualic circuit as in claim 1, wherein said proportional speed sensing valve comprises:

a housing, said housing having a supply port for communication with a supply pressure, a load sense port for communication with a load sense pressure and a pilot port for communication with a pilot pressure; and a valve spool slidable within said housing in an axial direction, said valve spool being axially movable to vary the size of a restriction between the supply port and the pilot port; and a control actuator slidable within said housing in said axial direction, said control actuator being axially movable in response to a differential between the supply pressure and the load sense pressure acting on said control actuator; and means coupling said valve spool and said control actuator so that the valve spool moves with movement of said control actuator.

12. A hydraulic circuit as in claim 11, wherein said coupling means includes a spring between said valve spool and said control actuator.

13. A hydraulic circuit as in claim 12, further comprising an abutment for stopping the movement of said control actuator at a certain differential between said supply pressure and said load sense pressure.

14. A hydraulic circuit as in claim 1, further comprising a supply pressure bypass valve which balances a supply pressure against a load sense pressure to maintain a certain differential between said supply pressure and said load sense pressure under normal operating conditions, and wherein said proportional speed sensing valve regulates the pressure supplied to the pilot ports of the work segments to be substantially equal to said differential under normal operating conditions.

15. A hydraulic circuit for communicating a flow of hydraulic fluid between a source of hydraulic fluid and two or more fluid power devices, comprising:

at least two work segments, each said work segment including:

a. a pressure operated proportional flow supply valve for controlling a flow of hydralic fluid to a fluid power device so as to control said fluid power device;

b. at least one control pressure port in communication with said supply valve for operating said valve in response to a pressure at said control pressure port;

c. a pilot pressure port; and d. a pressure control valve in communication with said pilot pressure port and said control pressure port for reducing a pressure from said pilot pressure port to a desired pressure at said control pressure port;

a proportional speed sensing valve for controlling the pressure at the pilot pressure ports of multiple work segments, said valve having:

a supply port;

a load sense control port;

a pilot port;

pilot control means for communicating a feedback control pressure to said valve from said pilot port; and supply control means for communicating a control pressure to said valve from said supply port;

means for communicating a load sense pressure from at least one of said work segments to said load sense control port;

means for communicating a supply pressure to said supply pressure port; and means for communicating the pilot pressure ports of said work segments with said pilot port.

16. A method for controlling the speed of multiple hydraulic fluid power devices when the demand of the devices exceeds the flow capacity of a pressure source supplying hydrualic fluid under pressure to the devices, comprising;

providing a source of hydrualic fluid under a supply pressure;

controlling the flow of hydrualic fluid form said source to multiple fluid power devices with two or more pressure controlled proportional flow supply valves;

providing a pilot pressure common to said pressure controlled proportional flow supply valves for controlling the operation of said valves;

providing a load sense pressure as a measure of a pressure of a hydraulic fluid provided to at least one of said fluid power devices by said valves;

comparing said supply pressure and said load sense pressure; and regulating the pilot pressure in response to the comparison between said supply pressure and said load sense pressure to reduce the speeds of the devices while maintaining substantially constant the proportions of the speeds to one another.

17. A method as in claim 16, wherein said pilot pressure is regulated to be substantially equal to the differential between said supply pressure and said load sense pressure.

18. A method as in claim 17, wherein said pilot pressure is regulated to be substantially equal to the differential between said supply pressure and said load sense pressure up to a certain limit.

19. A method as in claim 16, wherein multiple load sense pressures are provided, and further comprising the step of determining the highest of said load sense pressures, and wherein said step of comparing said supply pressure to said load sense pressure is performed by comparing said supply pressure to said highest of said load sense pressures.

* * * * *